United States Patent [19]

Allaire et al.

[11] 4,427,430
[45] Jan. 24, 1984

[54] METHOD CONTROLLING THERMAL GRADIENTS IN GLASS

[75] Inventors: Roger A. Allaire, Big Flats; Edwin J. Simonson, Bath, both of N.Y.

[73] Assignee: Corning Glass Works, Corning, N.Y.

[21] Appl. No.: 361,557

[22] Filed: Mar. 25, 1982

[51] Int. Cl.$^3$ .................................... C03B 23/207
[52] U.S. Cl. .................................... 65/41; 65/43; 65/103
[58] Field of Search ..................... 65/41, 103, 43

[56] References Cited

U.S. PATENT DOCUMENTS

| | | | |
|---|---|---|---|
| 3,265,488 | 8/1966 | Ross et al. | 65/103 X |
| 3,372,015 | 3/1968 | Richardson | 65/103 |
| 4,000,997 | 1/1977 | Rogers | 65/41 X |

Primary Examiner—Arthur D. Kellogg
Attorney, Agent, or Firm—B. R. Turner

[57] ABSTRACT

In the thermal cycles utilized for frit sealing glass members together for forming a glass housing and for baking-out such housing, shielding means are provided to protect and shield those portions of the glass members having multiple surfaces which would otherwise be exposed to excess thermal energy, from such thermal energy so as to inhibit the formation of detrimental thermal gradients within the housing structure.

3 Claims, 6 Drawing Figures

METHOD CONTROLLING THERMAL GRADIENTS IN GLASS

BACKGROUND OF THE INVENTION

In the manufacture of evacuated glass envelopes, such as for rectangular flat panel display devices, a plurality of bounding sidewalls are provided with a pair of opposed overlying plates or panels including a front or face plate panel and a back or base plate panel. The sidewalls as well as the opposed front and base plates are all preferably formed of glass and are fusion sealed together such as by means of frit material. As shown in my copending patent application Ser. No. 965,588 filed Dec. 1, 1978, and now Pat. No. 4,304,803, the front and back panels of the housing structure or envelope for the flat panel display device overlie and extend outwardly beyond the bounding sidewalls of such structure, and are necessary for providing a convenient electrical circuit feed-through means which extend along the inner surface of the front and/or back panels and through the frit seal formed with the adjacent sidewall to provide electrical connections from the exterior of the housing to internally positioned electrical components.

The assembly of a completed flat panel display device requires at least five thermal cycles before the final assembled display bulb is completed, which include glass compaction, sidewall assembly sealing, sealing alignment fixtures and supports for component parts to the face and base plates, sealing the sidewall assembly to the face plate and base plate assemblies, and finally, an evacuation and bake cycle. During the sealing and bake-out cycles, the overhang regions of the face plate and base plate, which may overhang as much as about $\frac{1}{2}''$ or so about the entire perimeter of the sidewalls, are subject to heating and cooling from both sides. All other regions of the housing, on the contrary, are heated and cooled only on one side. Such difference with respect to the applied heat and cooling is the cause of substantial thermal gradients in the glass components.

The stresses induced by the thermal gradients are of primary concern during heating due to the fact that rates are maximized in order to achieve proper frit flow for the sealing operation, and to obtain increased process rates during bakeout. In this connection, the internal surface of the face and base plate regions are subjected to a tensile stress, and any discontinuities which may be located at the ends of modular supports or vane spacers within the housing structure serve as stress concentrators and initiate failure origins. The thermal gradients which are generated in the glass components due to the differential heating produced by heating both the inner and outer surfaces of the overhang portion, while only heating the outer surface of the remainder of the structure, tend to result in structural failures of the housing during the sealing and bake-out cycles.

The present invention reduces the problem of glass breakage occasioned in the sealing and bake-out cycles of a housing enclosure for a flat panel display device by utilizing shielding means for retarding the heating of the overhanging glass portions of the face plate and base plate so as to reduce stress and permit higher process rates.

SUMMARY OF THE INVENTION

In its simplest form, the present invention not only recognizes and identifies problem areas relating to thermal gradients in the sealing and bake-out cycles employed in the manufacture of enclosing structures for flat panel display devices and the like, but also sets forth a new concept in controlling thermal gradients generated within the glass panels of the housing structure during such sealing and bake-out cycles, so as to reduce the stress produced by such thermal gradients and permit higher process rates while minimizing structural failures resulting from such gradients. The thermal gradients within the glass components of the housing structure are controlled during the various thermal cycles by utilizing shielding means for the overhanging portions of the face plate and base plate. Accordingly, since the overhanging portions are normally subjected to heating and cooling from both their inner and outer sides during thermal cycling, whereas the remaining portions of the structure are merely subjected to heating and cooling on their outer surface, by applying shielding means adjacent the overhanging portions of the face and base plates, heating and cooling are applied more evenly to the overall structure, thus lessening the generation of thermally produced gradients therewithin.

It thus has been an object of the present invention to obviate the problems of thermal gradients and structural breakage encountered in the prior art processes of sealing and baking-out flat panel display devices, by positioning a shielding device about selected portions of overhanging areas of such structure and thus virtually eliminating the detrimental effects produced by thermal gradients generated within the structure during such cycles.

DESCRIPTION OF THE PREFERRED EMBODIMENT

Figure 5:
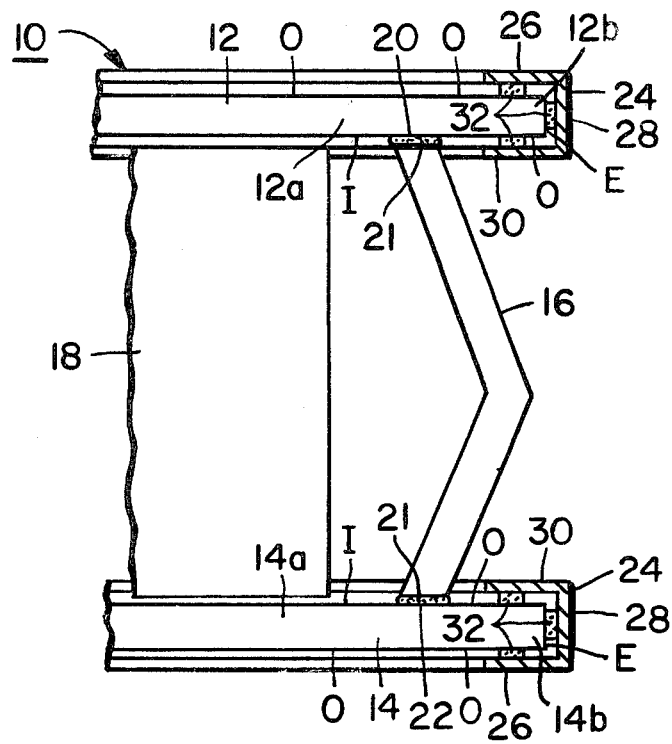
FIG. 5 is a fragmental schematic elevation view partially in section illustrating a flat panel display device structure provided with shielding means of the present invention about overhanging portions of the face and base plates.
Figure 6:
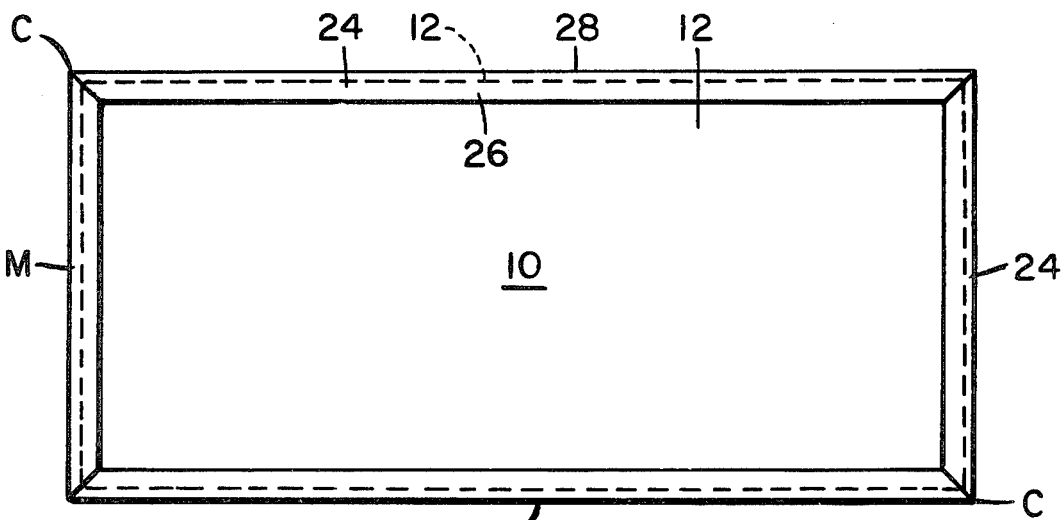
FIG. 6 is a top plan view of the entire flat panel display device fragmentally shown in FIG. 5.

Referring initially to FIGS. 5 and 6, a representative housing structure 10 for a flat panel display device is shown. The housing 10 includes a front panel or a face plate 12 and a back panel or base plate 14 which may be connected together by a plurality of angled or tapered sidewall portions 16. In order to support the face plate and base plate against the forces of atmospheric pressure when the interior of the housing is evacuated, a plurality of vane supports 18 may be positioned within the housing 10. Preferably, the face plate 12, base plate 14, sidewalls 16 and vane supports 18 are all made of glass, and the sidewall portions are not only preferably frit sealed together, but also frit sealed at 21 to the face plate along the intersections 20 therewith and to the base plate along the intersections 22 therewith.

It will be noted that those portions 12a of the face plate which are centrally of the intersections 20 with sidewalls 12, and that those portions 14a of the base plate which are centrally of the intersections 22 with the sidewalls, have only one outer or exposed surface 0, whereas the opposite surface is an inner surface I which is shielded by the housing 10. Conversely, those overhanging portions 12b of the face plate exteriorly of its intersections 20 with sidewalls 16, and those overhanging portions 14b of the base plate exteriorly of its intersections 22 with sidewall portions 16, have outer or exposed surfaces 0 on both sides of such overhangs.

In order to protect such overhanging portions 12b and 14b from excessive heating and cooling during thermal cycling for sealing and bake-out purposes, suitable shielding means 24 are provided about edge portions of the overhangs 12b and 14b. The shielding means 24 is shown as being of a C-shape with an outer portion 26, an edge portion 28, and an inner portion 30. If desired, the outer portion 26 may be omitted and L-shaped shielding means comprising edge portion 28 and inner portion 30 may be utilized. As shown particularly in FIG. 5, an insulator material 32, either in continuous strip form or in discontinuous patch form, is positioned between surface portions of the face and base plate overhangs 12b, 14b, and the shielding means 24 to space the shielding means from the surface portions of such overhangs. That is, since the shielding means is preferably formed of any suitable metal such as low alloy stainless steel, and the face plate and base plate are preferably made of glass, the insulating material, which may be a ceramic fiber made from alumina and silica sold under the trademark FIBERFRAX, functions to keep the metal shield off of and out of direct contact with the glass overhang. As noted, the insulating material 32 may overlie outer surface portions 0 and edge portions E of overhangs 12b and 14b.

In order to ascertain the temperature differentials which were exhibited across the surface of the face plate and base plate during typical thermal cycles, thermocouples were positioned in spaced locations about central portions of the face plate and base plate, at each of the 8 overhung corners C of the base plate and face plate, and at the 8 overhung mid-span edges M of the face plate and base plate. Data from each of these sets of thermocouples were averaged and plotted in FIGS. 1–4 for two different firing cycles. The same structure was run through two different firing cycles in a six-sided radiant-heated furnace with the bulb configuration being provided both with and without shielding means for each such cycle.

Figure 1:
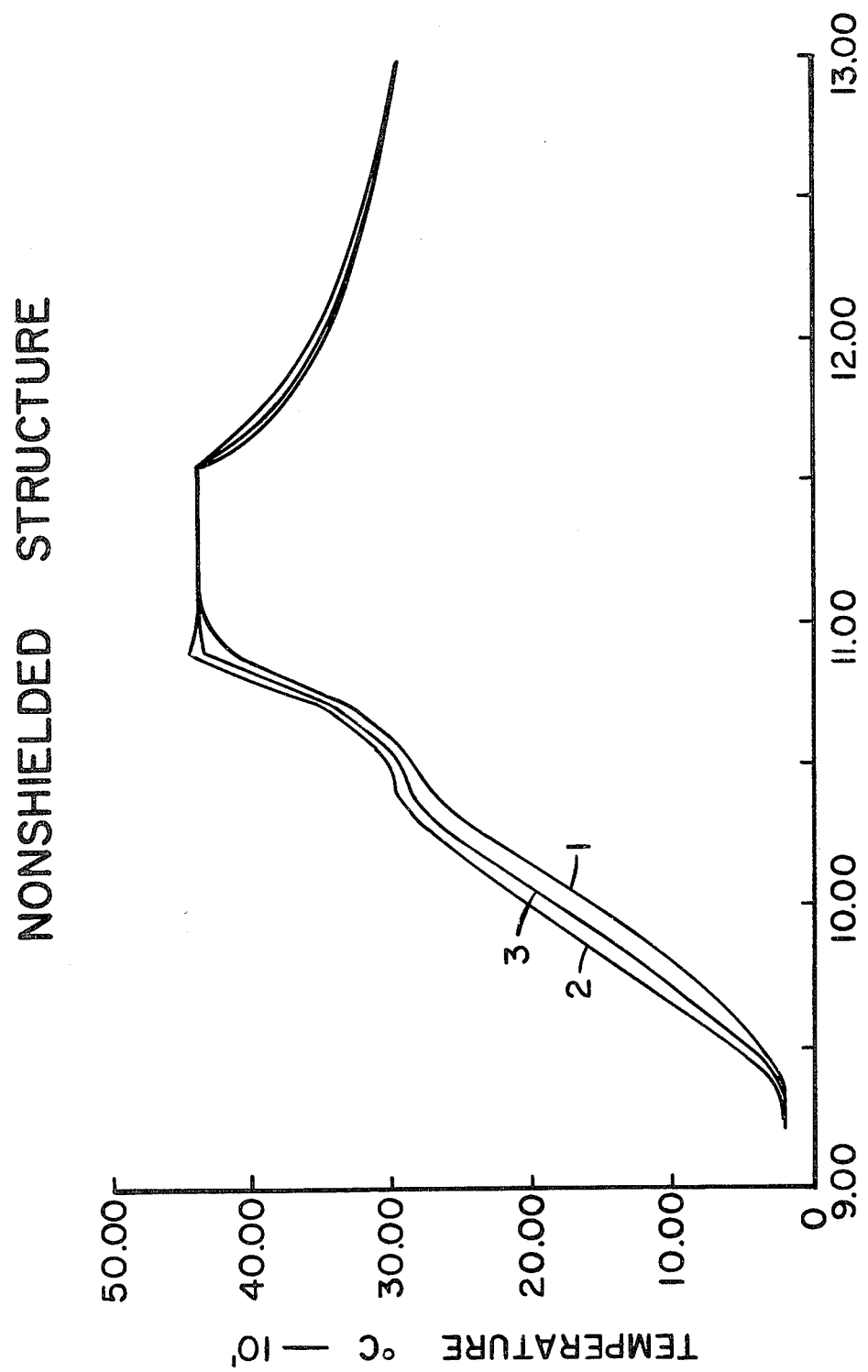
FIG. 1 is a graph of the temperatures of various portions of a nonshielded structure during a typical sealing thermal cycle.
Figure 2:
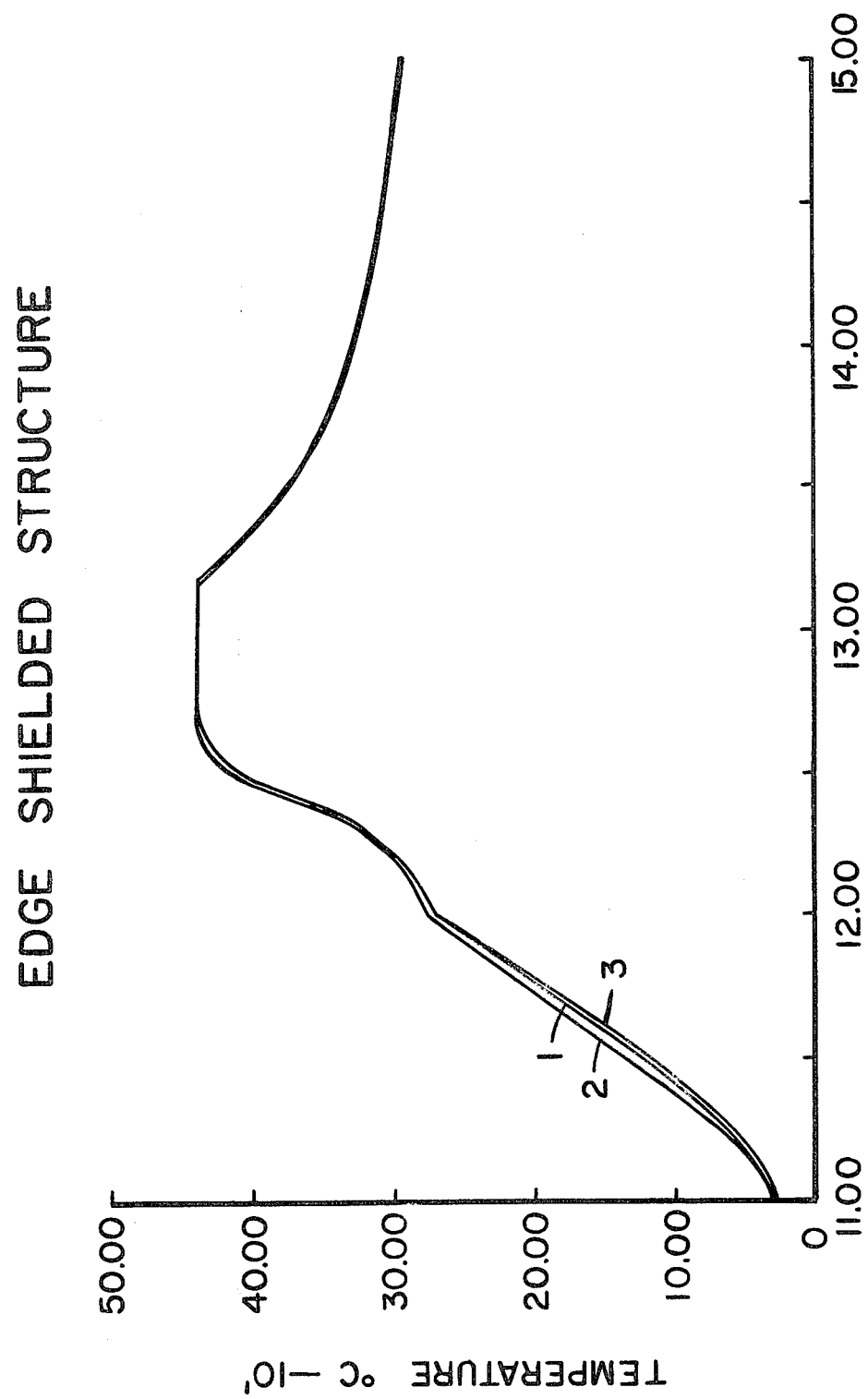
FIG. 2 is a graph of the temperatures of the same portions shown in FIG. 1, but of a shielded structure, during the same typical sealing thermal cycle utilized in FIG. 1.

With respect to FIGS. 1 and 2, a typical frit sealing process was employed for frit sealing the front panel or face plate 12 and the back panel or base plate 14 to the tapered sidewall portions 16. Such process included the steps of heating the structure from room temperature to 350° C. at a rate of 5° C. per minute, holding the structure for 30 minutes at 350° C., raising the temperature of the structure from 350° C. to 450° C. at a rate of 10° C. per minute, holding the structure for 45 minutes at 450° C., and finally cooling the structure to room temperature at a rate not faster than about 5° C. per minute. FIG. 1 illustrates the plotted result of such cycle on a structure which was not provided with the shielding means 24 of FIGS. 5 and 6, whereas FIG. 2 illustrates the plotted result of the same cycle on the same structure, when provided with a shielding means such as 24. In FIGS. 1–4, line 1 of the graph represents the temperature of the central portions of the face and base plates, line 2 represents the temperature of the overhung corners C of the face and base plates, whereas line 3 represents the temperatures of the overhung mid-span edges M of the face and base plates. As will be noted in FIG. 1, the maximum temperature difference is seen to be about 45° C. at about the 9.9 hour within the cycle. As shown in FIG. 2, when using the same schedule as that of FIG. 1, but utilizing a shielding means of the present invention, a maximum temperature variation of only about 10° C. is produced at about the 11.6 hour of the cycle. It thus can be seen from a comparison of FIG. 1, relating to a nonshielded structure, and FIG. 2 relating to an edge shielded structure of the present invention, that the temperature differential between the overhanging edge portions and the central portions of the face and base plates is substantially reduced through the use of the shielding process set forth herein so as to materially inhibit the generation of detrimental thermal gradients within the structure during thermal cycling.

Figure 3:
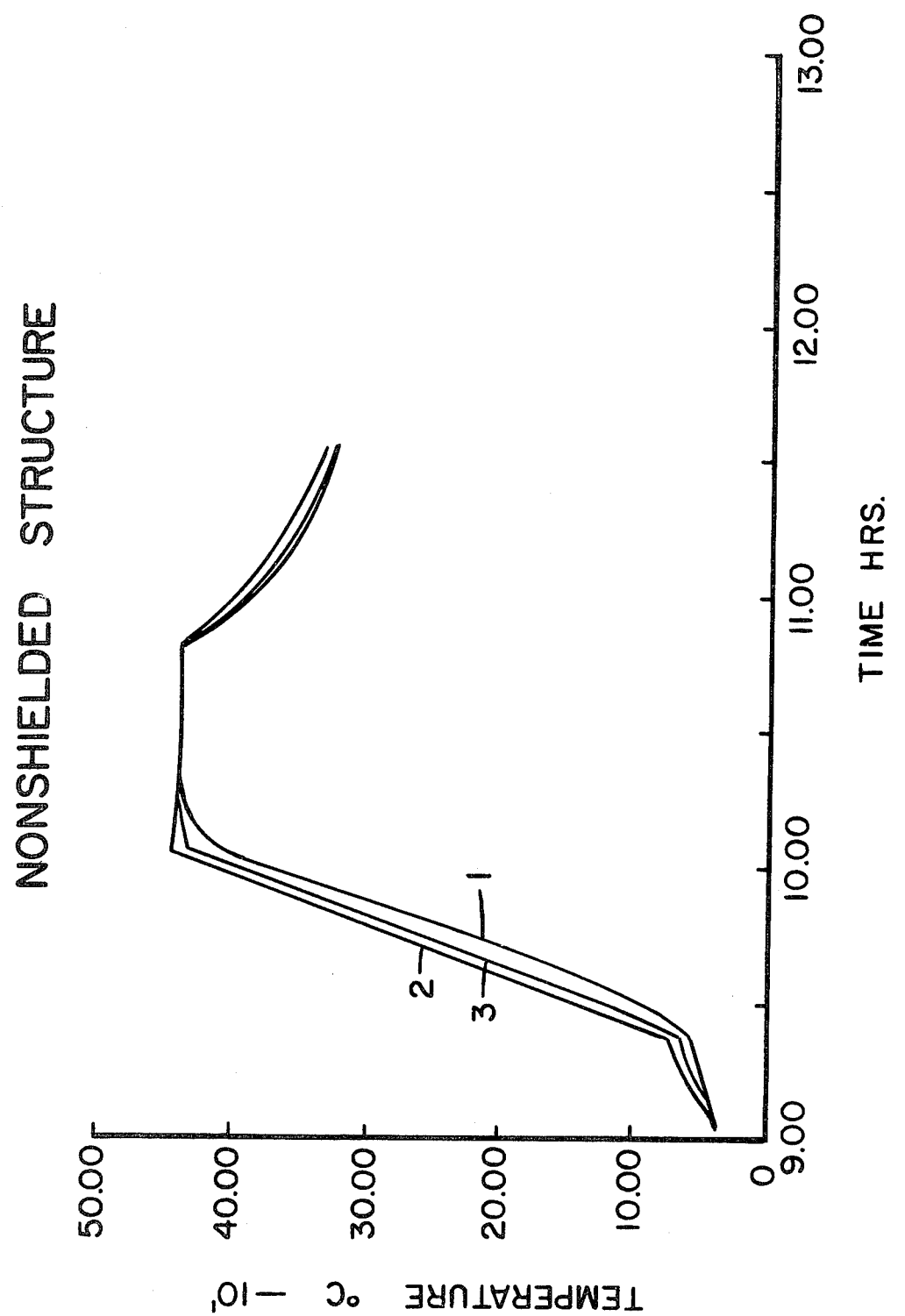
FIG. 3 is a graph of the temperatures of various portions of a nonshielded structure during a further typical sealing thermal cycle.
Figure 4:
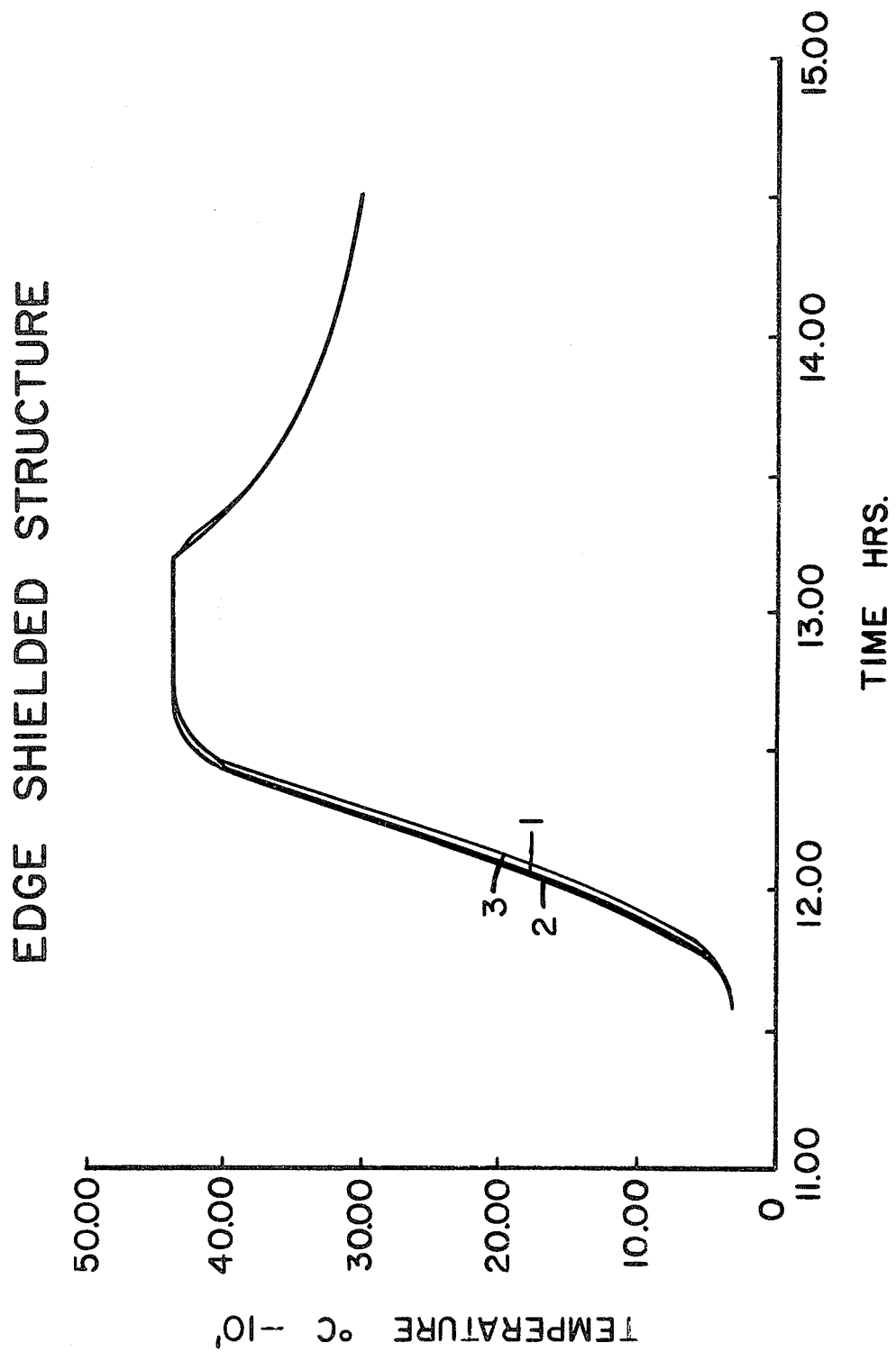
FIG. 4 is a graph of the temperatures of the same portions shown in FIG. 3, but for an edge shielded structure during the same sealing thermal cycle as utilized in FIG. 3.

The cycle utilized with respect to the results shown in the graphs of FIGS. 3 and 4 represents a faster schedule than that represented in FIGS. 1 and 2, in order to show the advantage of the present shielding process. In other words, in view of the fact that the shielding process of the present invention inhibits or retards the formation of detrimental thermal gradients within the structure, it is now possible to utilize more rapid thermal cycles, and thus improve productivity, while still reducing the detrimental effects which resulted with a slower cycle when the shielding process of the present invention was not incorporated. In the process shown in FIGS. 3 and 4, the structure is heated to a temperature of 450° C. at a rate of 10° C. per minute, held at 450° C. for 45 minutes, and then cooled to room temperature at a rate not faster than 5° C. per minute. As shown in FIG. 3, a maximum difference of about 58° C. is seen at the 9.7 hour period in the cycle, whereas when a shielding means of the present invention is employed with the same structure and the same cycle, only a 7° C. difference is seen at about the 12.1 hour period of the cycle, as shown in FIG. 4. Thus, a material improved in reducing temperature differentials across the surface of the face plate and base plate is obtained with the shielding process of the present invention, thereby reducing detrimental thermal gradients within the housing structure.

Although the preferred embodiments of the present invention have been disclosed with respect to the thermal shielding of overhanging portions of a housing structure, it will be appreciated that various changes and modifications may be made without departing from the spirit and scope of the invention as set forth in the appended claims, such as by applying the same shielding technique to overcome the effect of local hot spots which may exist along sidewall corner portions of the enclosure.

We claim:

1. In the process of thermally frit sealing glass members together for forming a structure wherein portions of at least some of said glass members are exposed to thermal energy on opposite surfaces thereof while remaining portions of such glass members have only one surface exposed to such thermal energy and wherein various portions of such members are heated to different temperatures by such thermal energy thereby producing detrimental thermal gradients within the structure, a method of inhibiting the formation of such detrimental thermal gradients within such structure which comprises, assembling the glass members to be frit sealed together with frit material between sealing junctions thereof, positioning metal radiation shielding means over at least one of the opposed surfaces of those portions of said members which are exposed to thermal energy on opposite surfaces so as to overlie virtually all of at least one of said opposed surfaces, maintaining said shielding means in spaced relationship from such opposed surfaces, and applying thermal energy to said members and frit sealing the same together along their junctions, while simultaneously shielding from said thermal energy virtually all of at least one surface of those portions of said glass members which would otherwise be exposed on opposite surfaces to such thermal energy, whereby the formation of detrimental thermal gradients within the structure formed by said glass members during the application of said thermal energy is inhibited.

2. A method of inhibiting the formation of detrimental thermal gradients as defined in claim 1 including the step of positioning insulating means between said glass members and said shielding means to maintain the shielding means in space relationship from said opposed surfaces.

3. A method of protecting portions of glass members forming a glass housing from excess thermal energy during thermal cycles utilized for frit sealing said members together and for baking out said housing wherein said portions of the glass members to be protected are in the form of overhanging portions extending exteriorly of the glass housing which comprises, applying thermal energy to said glass members forming said glass housing, shielding those surface portions of said glass members from radiation, which would otherwise be exposed to said thermal energy on more than one surface thereof, by applying metal radiation shielding means about those opposed surface portions of said overhanging portions which have opposed surfaces exposed to said thermal energy, applying insulating material between said metal shielding means and said opposed surface portions of said overhanging portions to space said metal shielding means from said surface portions, and maintaining said metal shielding means in spaced-apart relationship with said surface portions, whereby the generation of undesirable thermal gradients within the housing structure during the application of thermal energy is inhibited.

* * * * *